(12) United States Patent
Larsen et al.

(10) Patent No.: US 10,759,060 B1
(45) Date of Patent: Sep. 1, 2020

(54) ADAPTIVE BUNDLE GRIPPING END EFFECTOR

(71) Applicant: The Boeing Company, Chicago, IL (US)

(72) Inventors: Ty A. Larsen, Everett, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/363,771

(22) Filed: Mar. 25, 2019

(51) Int. Cl.
*B25J 15/02* (2006.01)
*B25J 9/12* (2006.01)

(52) U.S. Cl.
CPC .............. *B25J 15/02* (2013.01); *B25J 9/126* (2013.01)

(58) Field of Classification Search
CPC ......... B25J 15/02; B25J 9/126; B25J 15/0014
See application file for complete search history.

(56) References Cited

U.S. PATENT DOCUMENTS

| | | | | |
|---|---|---|---|---|
| 9,068,634 | B2* | 6/2015 | Cui | F16H 25/14 |
| 10,086,518 | B1* | 10/2018 | Fromm | B25J 15/024 |
| 2012/0153653 | A1* | 6/2012 | Lavalley | E21B 19/14 |
| | | | | 294/86.41 |
| 2016/0303745 | A1* | 10/2016 | Rockrohr | B25J 17/0258 |
| 2017/0014197 | A1* | 1/2017 | McCrea | B25J 9/104 |

* cited by examiner

*Primary Examiner* — Stephen A Vu
(74) *Attorney, Agent, or Firm* — Felix L. Fischer

(57) ABSTRACT

A bundle gripping tool employs a support ring concentric to a bundle axis and having a first open sector accessing a central aperture. A closure ring mounted on the support ring is concentric with and rotatable about the bundle axis and has a second open sector wherein rotation of the closure ring to an open position at least partially aligns the first and second open sectors exposing the central aperture. Rotation to a closed position misaligns the second open sector from the first open sector, covering the first open sector gating the central aperture. A plurality of snare cables is engaged between a first set of attachment points on the support ring and a second set of attachment points on the closure ring. The first set of attachment points and second set of attachment points are relatively positioned whereby each of said plurality of snare cables partially encircles the bundle axis in the closed position and exposes the bundle axis in the open position. An operating mechanism is configured to rotate the closure ring.

20 Claims, 17 Drawing Sheets

ADAPTIVE BUNDLE GRIPPING END EFFECTOR

REFERENCES TO RELATED APPLICATIONS

This application is copending with U.S. application Ser. No. 16/363,837 filed substantially concurrently herewith entitled AN ADAPTIVE BUNDLE GRIPPING END EFFECTOR WITH OPENING JAW having docket no. 18-0211-US-NP2, now issued as U.S. Pat. No. 10,583,567, the disclosure of which is incorporated herein by reference.

BACKGROUND INFORMATION

Field

Implementations shown in the disclosure relate generally to bundle gripping systems and more particularly to implementations for a bundle gripping tool employing a support ring and a closure ring having open sectors aligned to receive a cable bundle and misaligned to constrain the cable bundle with snare cables engaged between the support ring and closure ring.

Background

Bundling of wires in manufacturing operations for complex electronic and electromechanical system in products such as aircraft or other vehicles is highly labor intensive. Wires may be routed on looms or form-boards creating various harness arrangements that branch, coalesce and terminate in highly complex patterns. Bundling and tying of groups of wires is required to create the harnesses and maintain the orderly arrangement of the various bundles for attachment of connectors or insertion into electrical assemblies.

SUMMARY

Implementations shown herein provide a bundle gripping tool having a support ring concentric to a bundle axis and having a first open sector accessing a central aperture. A closure ring is mounted on the support ring. The closure ring is concentric with and rotatable about the bundle axis and has a second open sector wherein rotation of the closure ring to an open position at least partially aligns the second open sector with the first open sector exposing the central aperture and rotation to a closed position, misaligning the second open sector from the first open sector, covers the first open sector gating the central aperture. A plurality of snare cables are engaged between a first set of attachment points on the support ring and a second set of attachment points on the closure ring, said first set of attachment points and second set of attachment points relatively positioned whereby each of said plurality of snare cables partially encircles the bundle axis in the closed position and exposes the bundle axis in the open position. An operating mechanism is configured to rotate the closure ring.

The implementations allow a method for handling of bundles. A bundle gripping tool having a support ring and a rotatable closure ring is positioned with the closure ring in an open position exposing a central aperture through a first open sector of the support ring and an aligned second open sector on the closure ring. A bundle axis is exposed in the open position with snare cables engaged at first ends at a first set of attachment points on the support ring and on second ends at a second set of attachment points on the closure ring. A bundle is inserted through the first and second open sectors into the central aperture. The closure ring is rotated with a motor through a range of rotation to a closed position misaligning the second open sector from the first open sector and covering the first open sector to gate the central aperture. The bights of the snare cables are transitioned with rotation of the closure ring from a convex configuration to a concave configuration and the bundle axis and inserted bundle are partially encircled with the snare cables in the closed position.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

Figure 1:
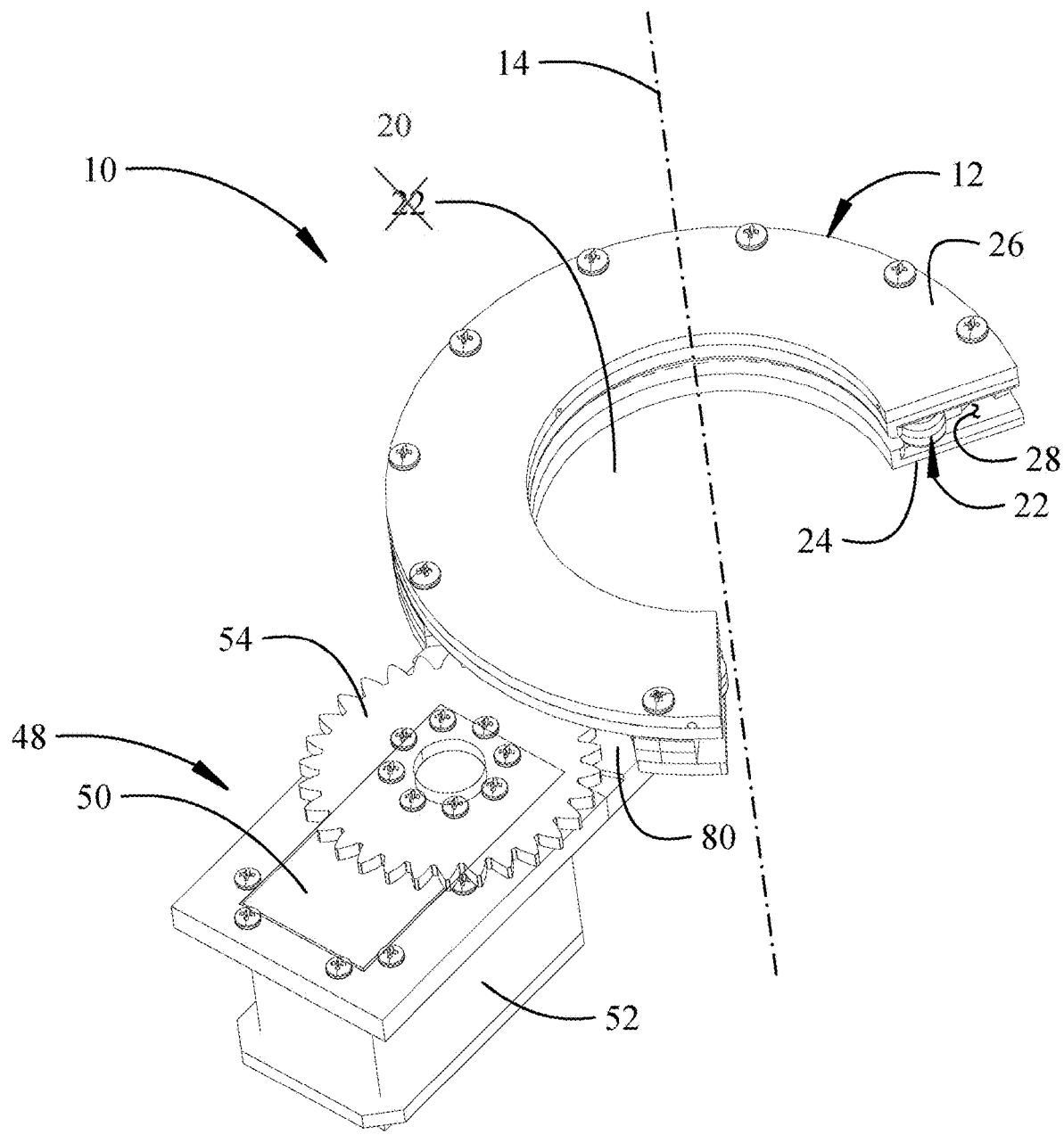
FIG. 1 is a pictorial view of an example of a bundle gripping tool with the closure ring in the open position exposing the bundle axis.
Figure 2:
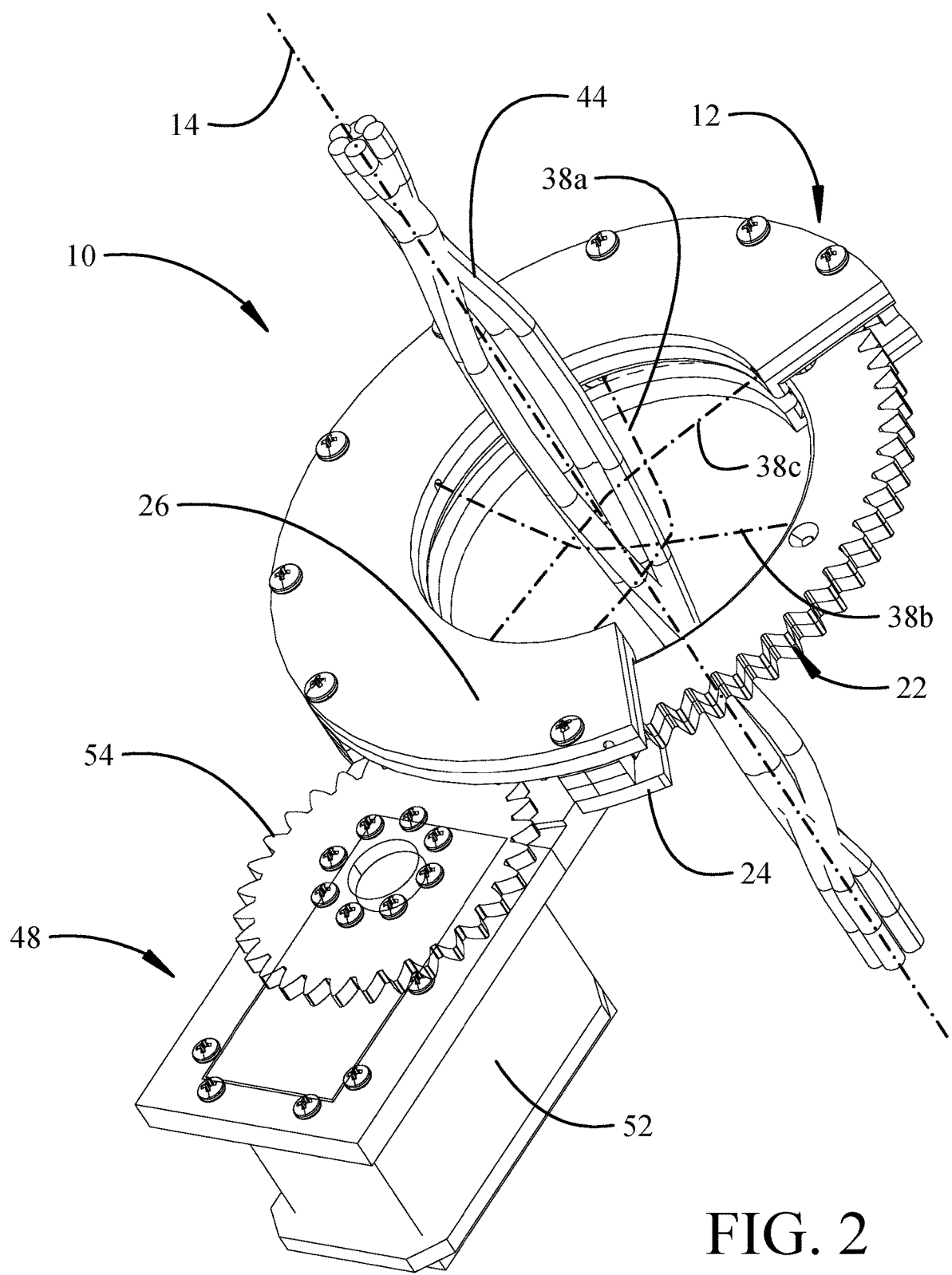
FIG. 2 is a pictorial view of the example with the closure ring in the closed position.
Figure 3:
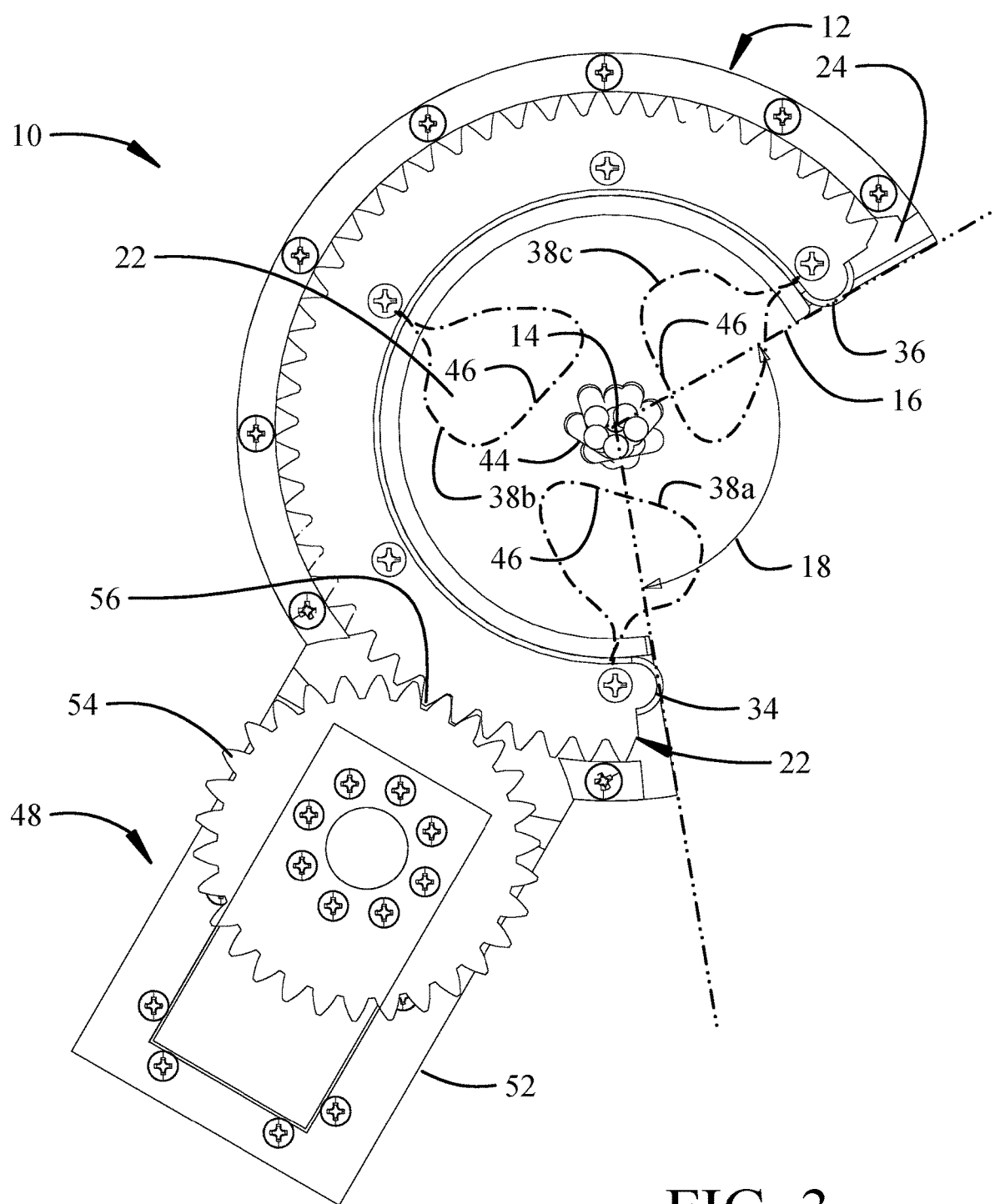
FIG. 3 is a top view of the example with the closure ring in the open position and the cover of the support ring removed.
Figure 4:
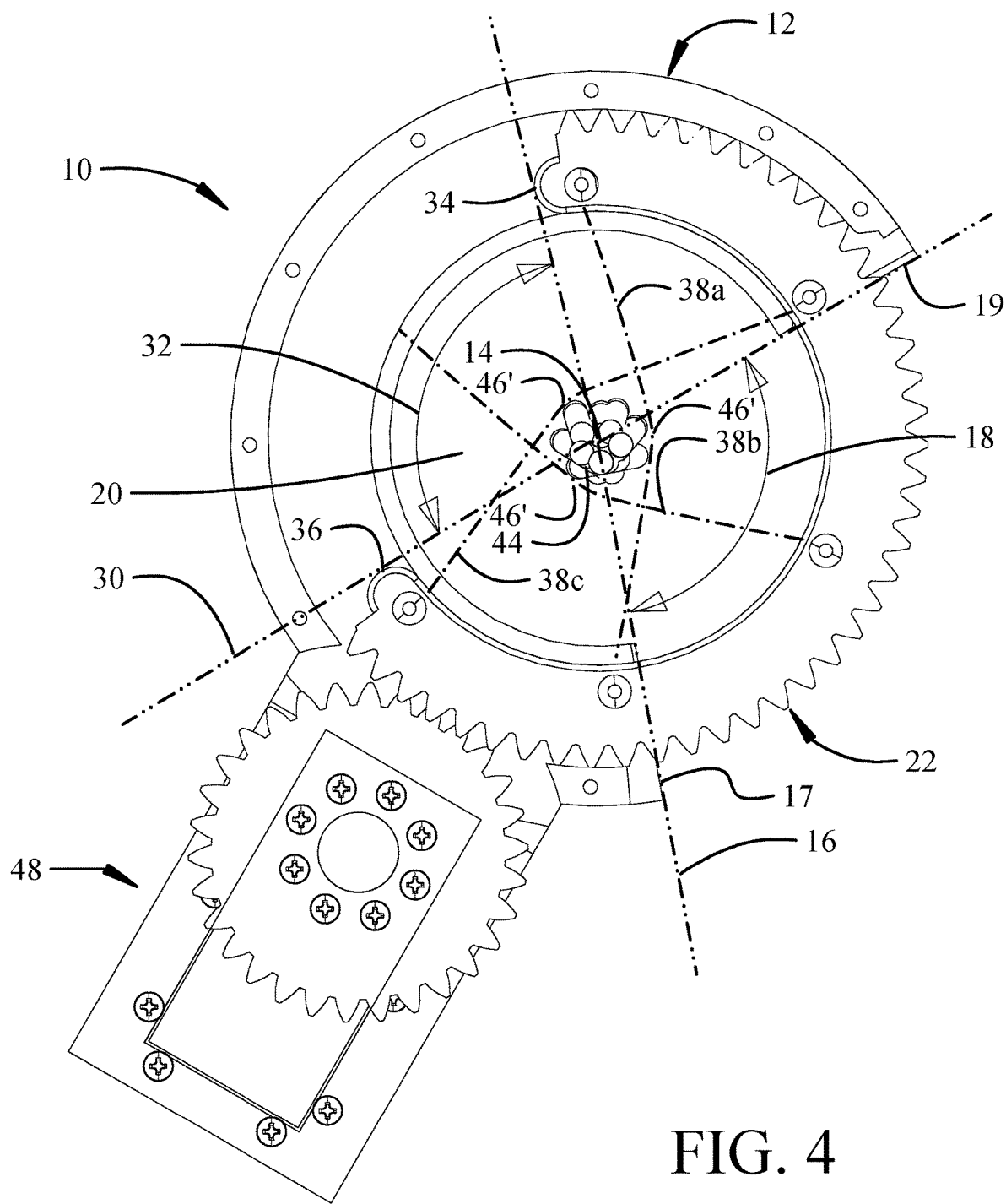
FIG. 4 is a top view of the example with the closure ring in the closed position and the cover of the support ring removed showing a fully rotated position of the closure ring.

The examples described herein provide an adaptive bundle gripping tool for wire bundles, tubing bundles or similar bundled objects, which can be operated as an end effector on a robotic manipulator, a hand held tool, or a mounted retainer system. The examples herein will depict wire bundles as the gripped bundles. Referring to the drawings, FIGS. 1-4 show a bundle gripping tool 10 having a support ring 12 concentric to a bundle axis 14. The support ring 12 has a first open sector 16 having a first sector angle 18 accessing a central aperture 20. A closure ring 22 is mounted on the support ring 12. In one example shown in the drawings, the support ring 12 has a receiving base 24 and a cover 26, both open to the central aperture 20, forming a track 28 receiving the closure ring 22. The closure ring 22 is also concentric with and is rotatable in the track 28 about the bundle axis 14. The closure ring 22 has a second open sector 30 (best seen in FIG. 4), which with the closure ring 22 rotated to an open position as shown in FIGS. 1 and 3, at least partially aligns the second open sector 30 with the first open sector 16 of the support ring 12 to expose the central aperture 20. The second open sector 30 has a second sector angle 32 equal to the first sector angle 18 in the example and the second sector aligns at both a leading termination 34 and trailing termination 36 with a first termination 17 and a second termination 19 of the first sector, respectively. Rotation of the closure ring 22 to a closed position, as shown in FIGS. 2 and 4, misaligns the second open sector 30 from the first open sector 16 and in a fully closed position covers the first open sector gating the central aperture.

Figure 5:
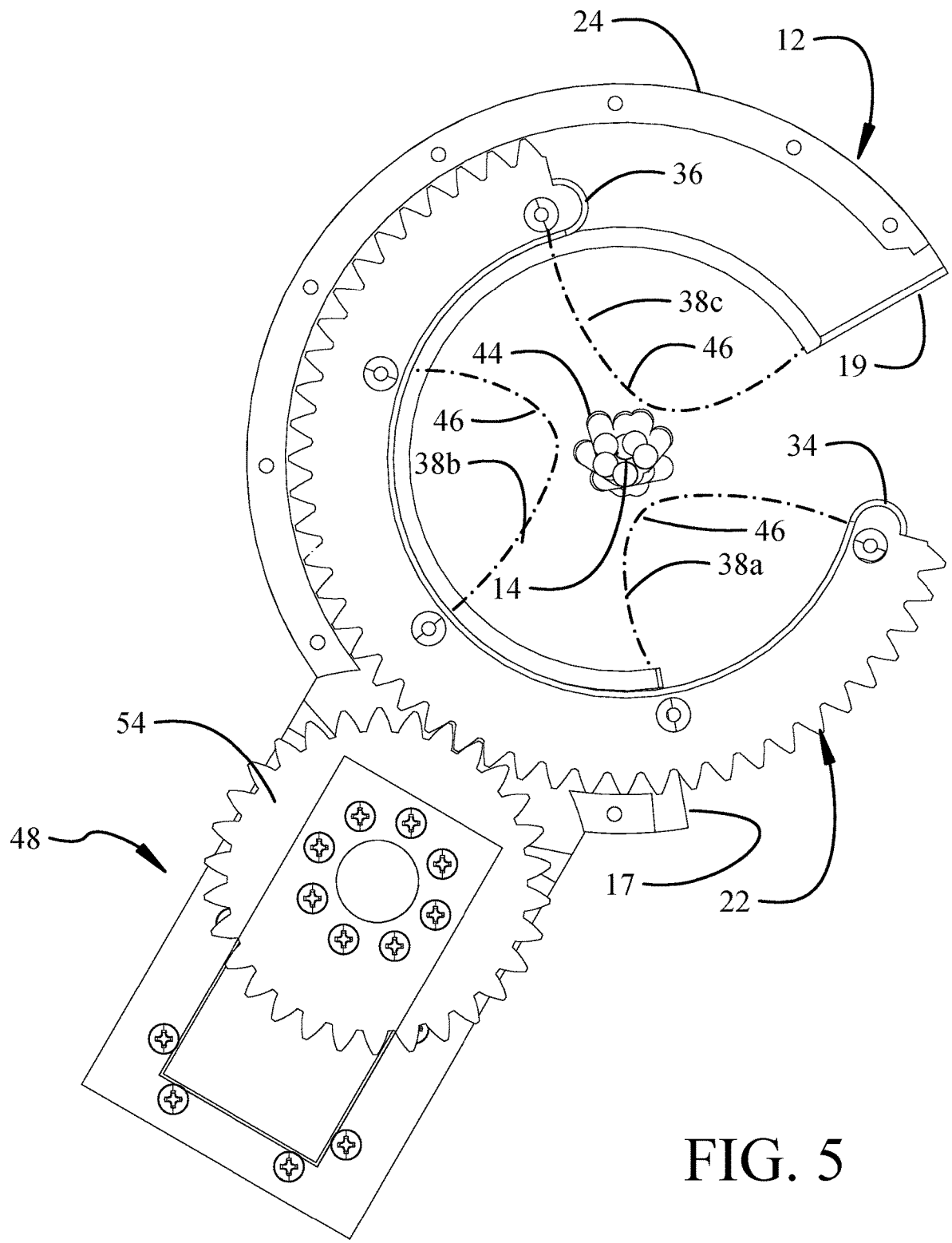
FIG. 5 is a pictorial view of the example with the closure ring in a partially closed position.
Figure 6:
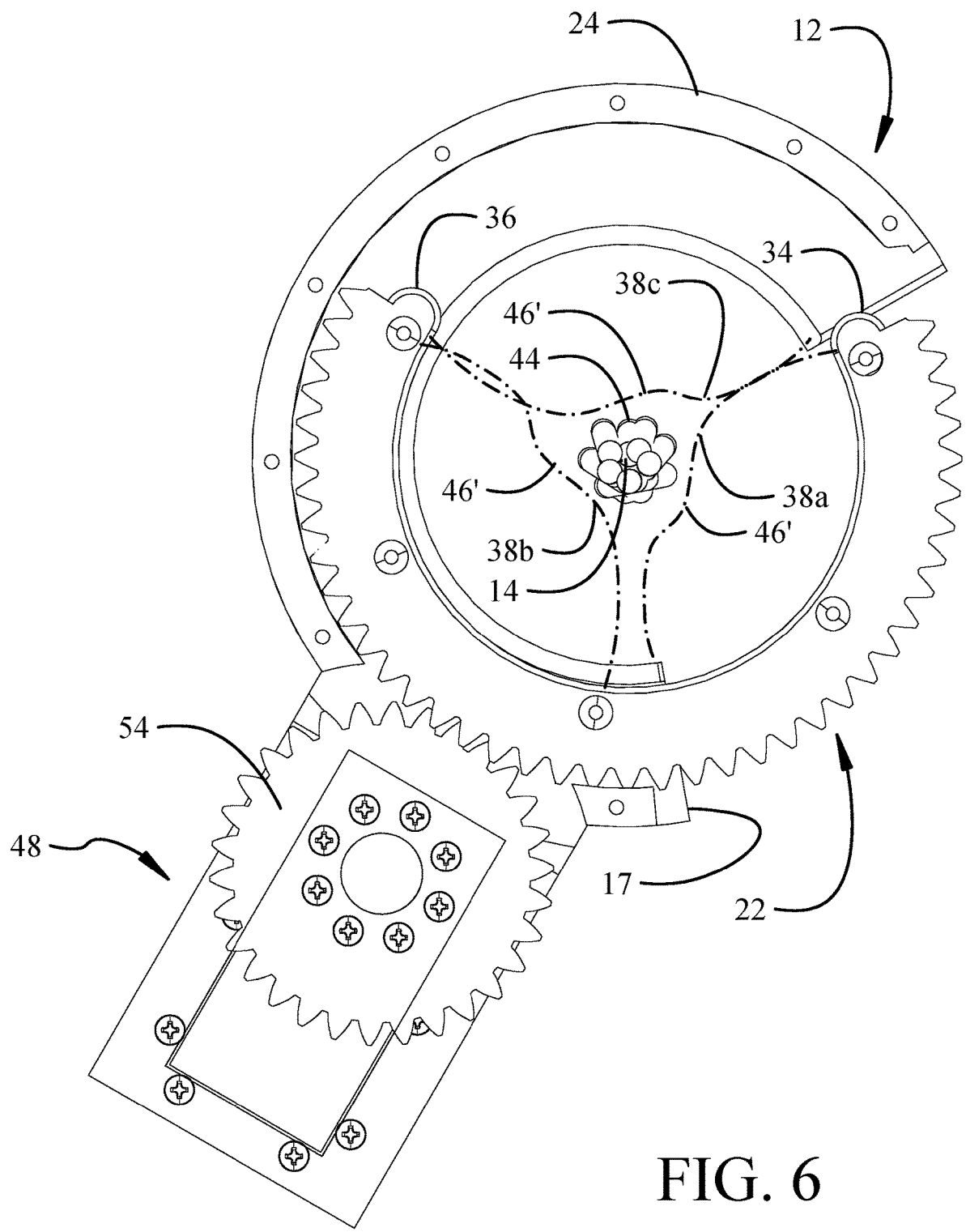
FIG. 6 a pictorial view of the example with the closure ring in a contact position closing the first open sector.

A plurality of snare cables (generally designated 38 and specifically 38a, 38b and 38c, in a first example of FIGS. 1-4), is engaged at first ends 39a, 39b, 39c to a first set of attachment point 40a, 40b, 40c on the support ring 12 and at second ends 41a, 41b and 41c, to a second set of attachment points 42a, 42b 42c on the closure ring 22. As will be described in greater detail subsequently, the first set of attachment points and second set of attachment points are relatively positioned such that each of the plurality of snare cables partially encircles the bundle axis 14 in the closed position of the closure ring 22 and exposes the bundle axis 14 to the first open sector 16 and second open sector 30 in the open position of the closure ring 22 thereby allowing lateral insertion of wires in a wire bundle 44 through the open sectors into the central aperture 20. As seen in FIGS. 5 and 6 showing the closure ring 22 in transition from the open position to the closed position, relative encirclement and engagement of the wire bundle 44 is accomplished by the rotation of the closure ring 22 straightening the bight 46 of the snare cables from a highly convex configuration shown in FIGS. 1 and 3 and then reversing the bight, designated 46', to a concave configuration to ensnare the wire bundle 44. Additional rotation increases the concavity of the bight 46' which provides multiple benefits. The wires in the wire bundle 44, which are initially loose, are drawn together and consolidated into a bundle. Further, the engagement and tightening of the bights 46' created by the rotation of the closure ring 22 urges the wire bundle 44 to a central position substantially concentric with the bundle axis 14 regardless of initial position.

An operating mechanism 48 is configured to rotate the closure ring 22. One example employs an electric motor 50 encased in a body 52 extending from the support ring 12. The electric motor 50 rotates a drive gear 54 which engages gear teeth 56 on an outer circumference of the closure ring 22.

Figure 7:
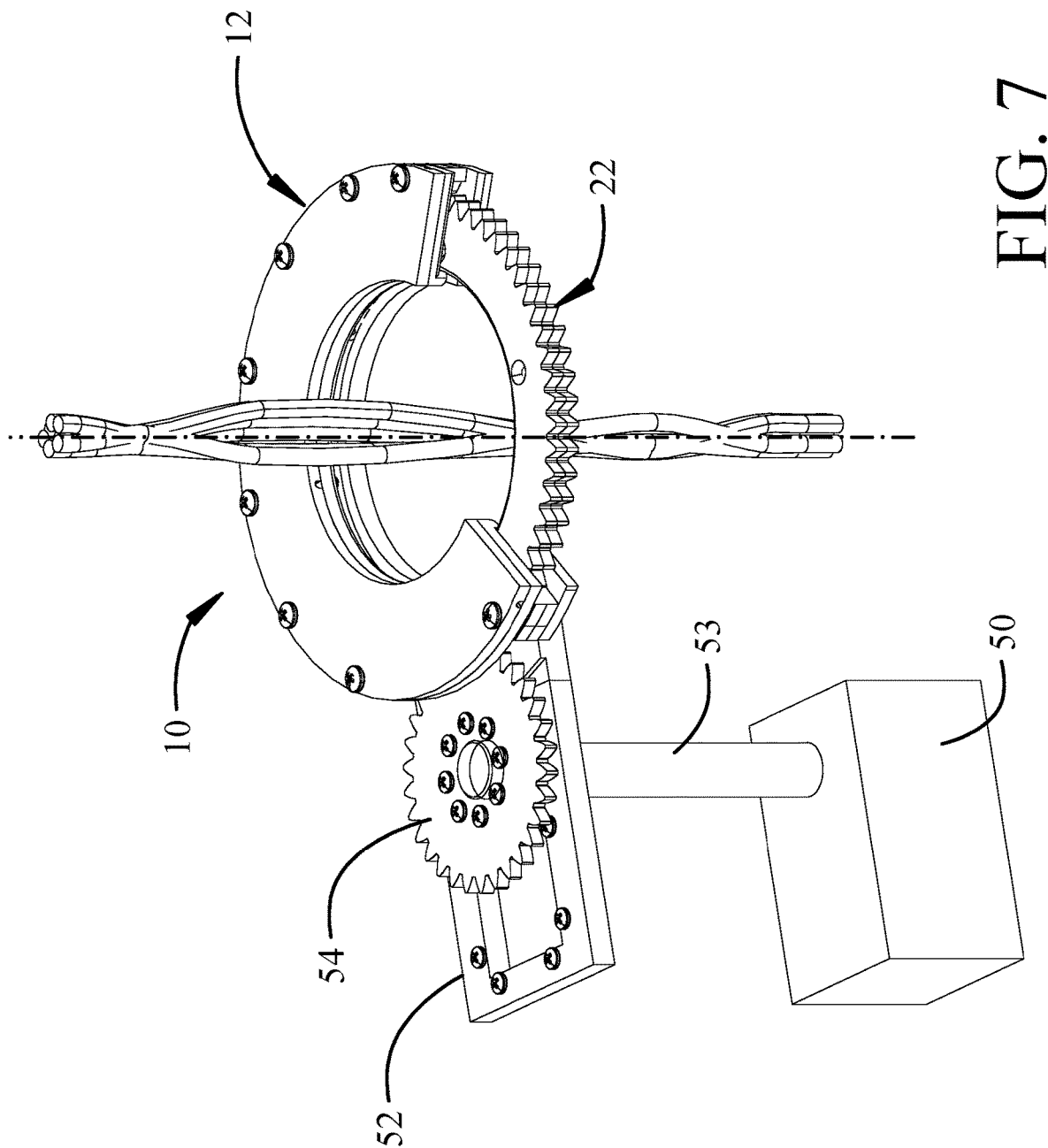
FIG. 7 is a pictorial view of an alternative configuration of the drive mechanism with a drive shaft for extended placement of the motor from the drive gear.
Figure 8:
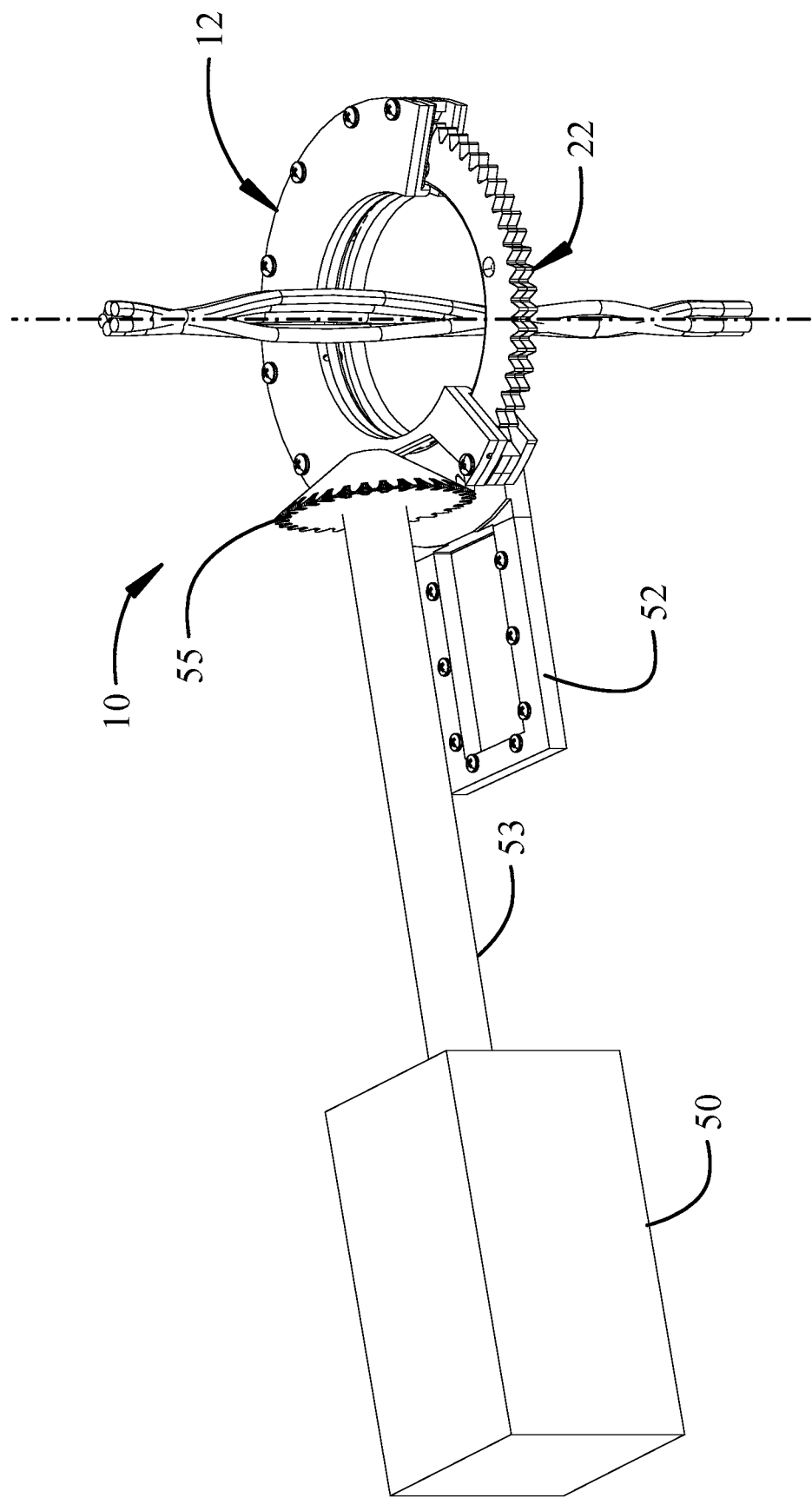
FIG. 8 is a pictorial view of an alternative configuration of the drive mechanism with a bevel gear arrangement.

In an alternative implementation a pneumatic motor is employed for rotation of the drive gear. Location of either the electric motor 50 or pneumatic motor can be extended from the support ring 12 by use of an intermediate drive shaft 53 engaging the drive gear 54 as seen in FIG. 7. In the example the drive gear 54 and closure ring are coplanar. Alternative implementations employ a toothed slot on a bottom or top surface of the closure ring receiving a perpendicularly oriented drive gear or a bevel gear 55 as shown in FIG. 8. Multiple gear stages are employed in various implementations for controlling rotation speed and torque.

In the example, the first sector angle 18 and the second sector angle 32 are substantially equal and are in a range of 100 to 125° and nominally 120°. Three snare cables 38a, 38b, 38c are employed with the first set of attachment points 40a, 40b and 40c positioned on the support ring 12 proximate the first termination 17, an azimuthal position intermediate the first termination and second termination 19, and at the second termination 19. The second set of attachment points 42a, 42b, 42c are positioned on the closure ring similarly located proximate the leading termination 34, an azimuthal position intermediate the leading termination 34 and trailing termination 36 and proximate the trailing termination 36. The shape formed by the snare cables approximates a Reuleaux Triangle emulating an ideal shape of a circle. During operation, after initially condensing the wire bundle 44 in the snare cables 38, the closure ring 22 can be rotated back and forth several times (by about 45 degrees). This semi-circular motion has the benefit of pulling all the contained wires into a more circular form than the initial Reuleaux triangular shape alone. Rotations of a Reuleaux triangle exhibit a substantially circular motion. In alternative implementations, the second sector angle 32 may be greater than the first sector angle with the minimum requirement that the closure ring 22 in the closed position extends across the first open sector. While the plurality of snare cables 38 is three in the example two or more snare cables are employed in alternative implementations to accommodate varying wire bundle sizes and tensioning requirements.

Figure 9:
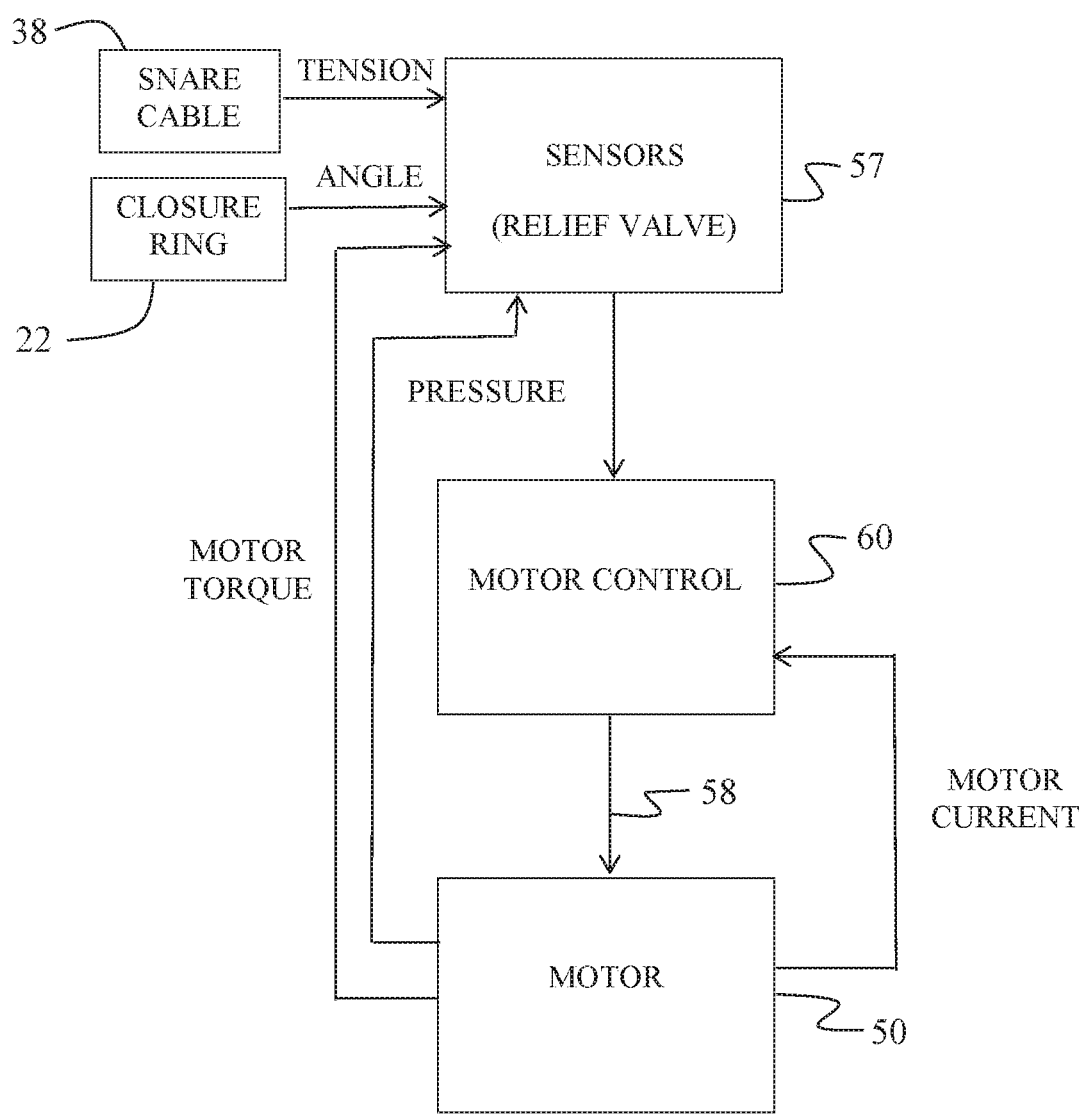
FIG. 9 is a block diagram of a sensor and control system for the motor to control rotation of the closure ring.

To accommodate varying wire bundle sizes (both number of wires and wire gage) the rotation of the closure ring 22 is controlled to provide a desired tension in the snare cables 38 to consolidate the wire bundle 44. As shown in FIG. 9, one or more sensors 57 measuring tension in the snare cables 38 providing a signal received by a motor control 60 which transmits a control signal 58 that stops the motor 50 at a predetermined tension in the snare cables 38. In certain implementations the sensor 57 is a rotation sensor measuring angular rotation of the closure ring 22 as opposed to actual tension in the snare cables. Alternatively the sensor 57 is a torque sensor measuring torque on the motor 50. For use with the pneumatic motor implementation the sensor 57 is a relief valve which maintains a predetermined maximum back pressure in the motor to achieve the desired snare cable tension. Alternative sensors such as optical position sensors or synthetic vision systems may also be employed. The motor control 60 may also receive control parameters such as motor current directly from the motor 50. In certain implementations, the snare cables 38 are elastic to provide a stretching engagement of the wire bundle. As seen in FIGS. 4 and 6, the closed position has a range of rotation of the closure ring 22 from a contact position rotated sufficiently to block the first open sector 16 (FIG. 6) to a fully rotated position for compressing a wire bundle with a minimal radius (FIG. 4). The sensors 57 determine the rotational stopping position of the closure ring 22.

Figure 10:
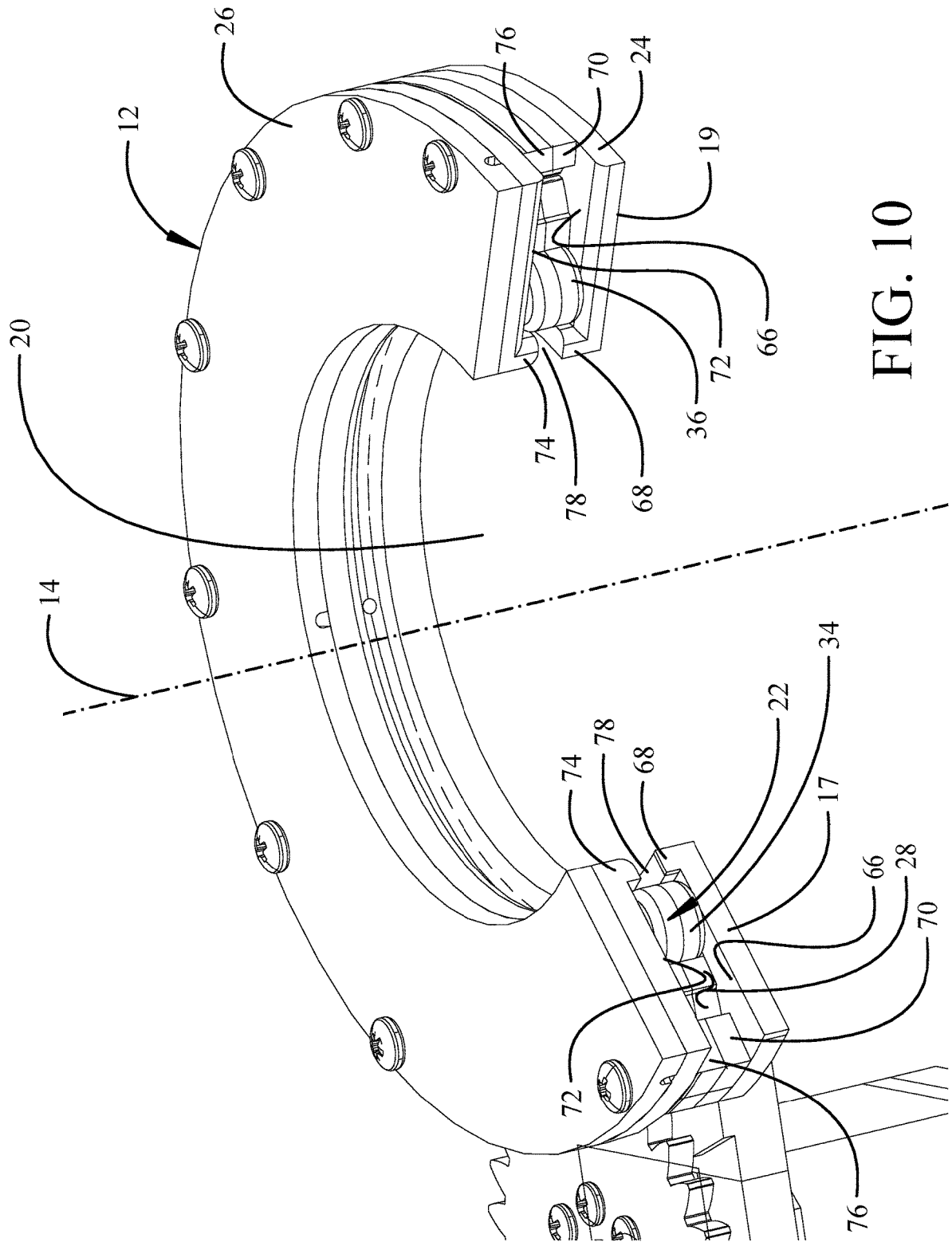
FIG. 10 is a detail view of the support base and cover of the support ring.

Returning to FIGS. 1-4 and detail FIG. 10, the support ring 12 of the first example employs the receiving base 24 and cover 26 which engage and constrain the closure ring 22 in the desired rotational track 28. Receiving base 24 has a first channel 66 with inner flange 68 and outer flange 70. Similarly, cover 26 is mated to the receiving base 24 and has a second channel 72 with an inner flange 74 and outer flange

76. Outer flanges 70 and 76 engage to space the first channel 66 and second channel 72 creating the track 28 to receive the closure ring 22. Inner flanges 68 and 74 provide a slot 78 open to the central aperture 20 through which the snare cables 38 pass from the second set of attachment points 42a, 42b, 42c on the closure ring 22. Outer flanges 70 and 76 incorporate a lateral channel 80 (seen in FIG. 1) receiving drive gear 54 to engage the gear teeth 56 on the closure ring 22. Use of a split receiving base 24 and cover 26 allows simple insertion of the closure ring 22 and attachment of the ends of the snare cables 38 at the attachment points.

In an alternative implementation a single piece support ring 12 is employed and the closure ring 22 is inserted spirally through the exposed ends of the first and second channels in the first open sector.

Figure 11:
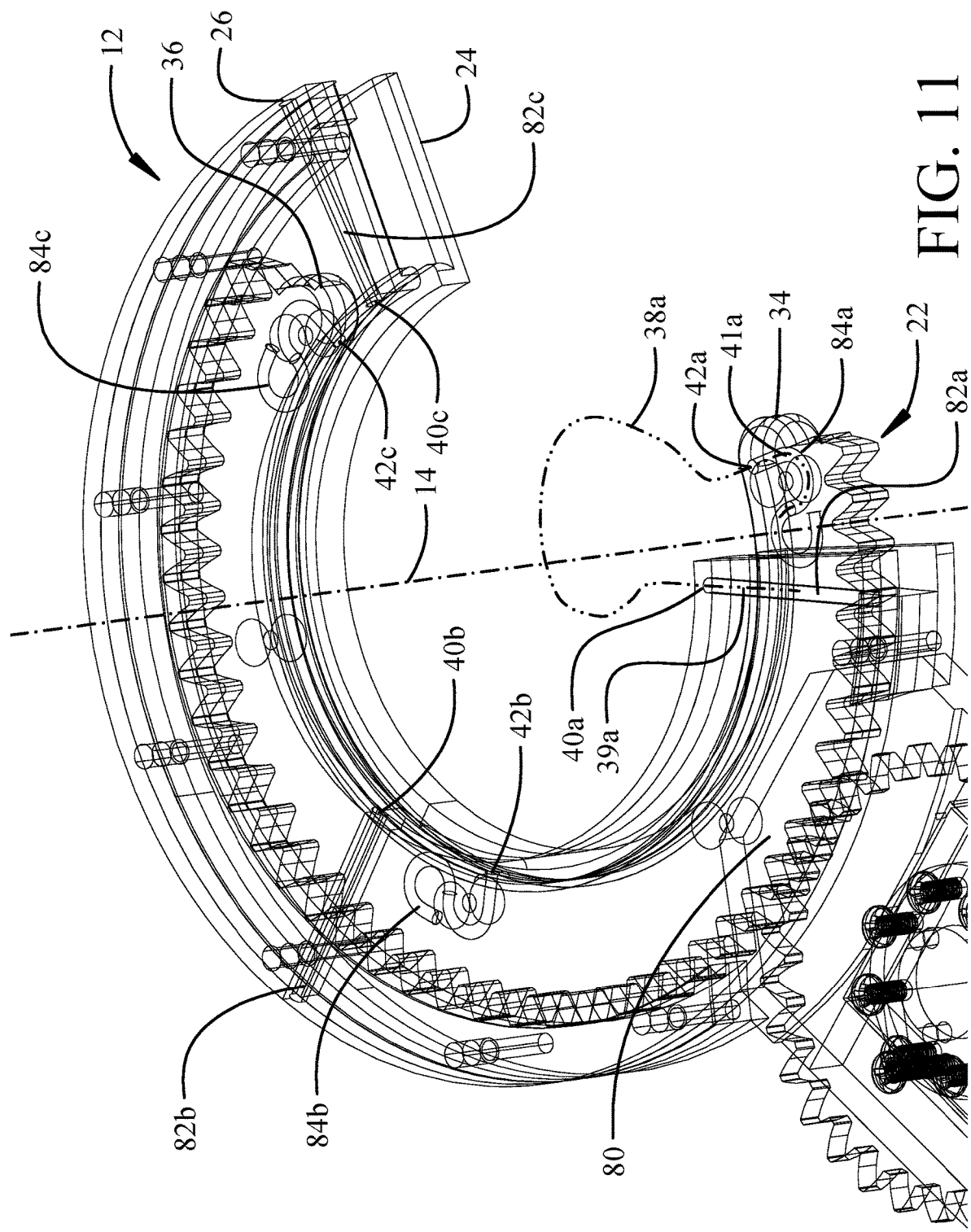
FIG. 11 is a wire-frame detail pictorial view of the structure and configuration of attachment points for the snare cables on the support ring and closure ring.
Figure 12:
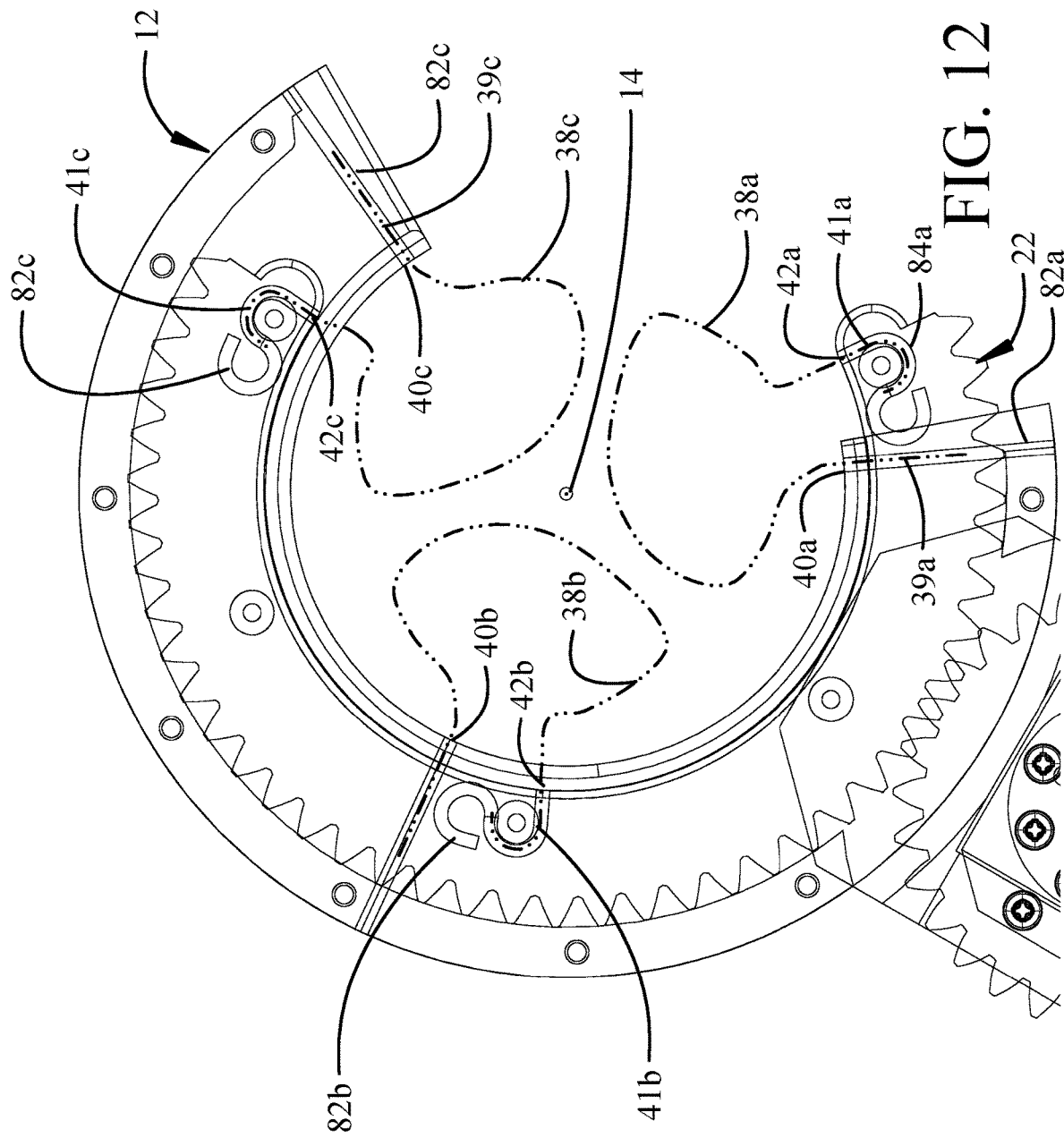
FIG. 12 is a wire-frame top view of the structure and configuration of attachment points for the snare cables on the support ring and closure ring.

In the example of FIGS. 1-4, engagement of the snare cables at the first and second sets of attachment points is seen in detail in FIGS. 11 and 12 with the closure ring 22 beginning travel from the open position to the closed position. The first set of attachment points 40a, 40b and 40c are implemented by conduits 82a, 82b and 82c in the cover 26 of the support ring 12 receiving and constraining the first ends 39a, 39b and 39c of the snare cables 38a, 38b and 38c. Serpentine channels 84a, 84b and 84c of the closure ring 22 provide the second set of attachment points 42a, 42b and 42c by receiving and constraining the second ends 41a, 41b and 41c of the snare cables 38a, 38b and 38c. While the first set of attachment points is shown on the cover 26 in the example, similar conduits are alternatively provided in the receiving base 24 in other implementations since both the cover and receiving base remain stationary relative to the rotating closure ring.

Figure 13:
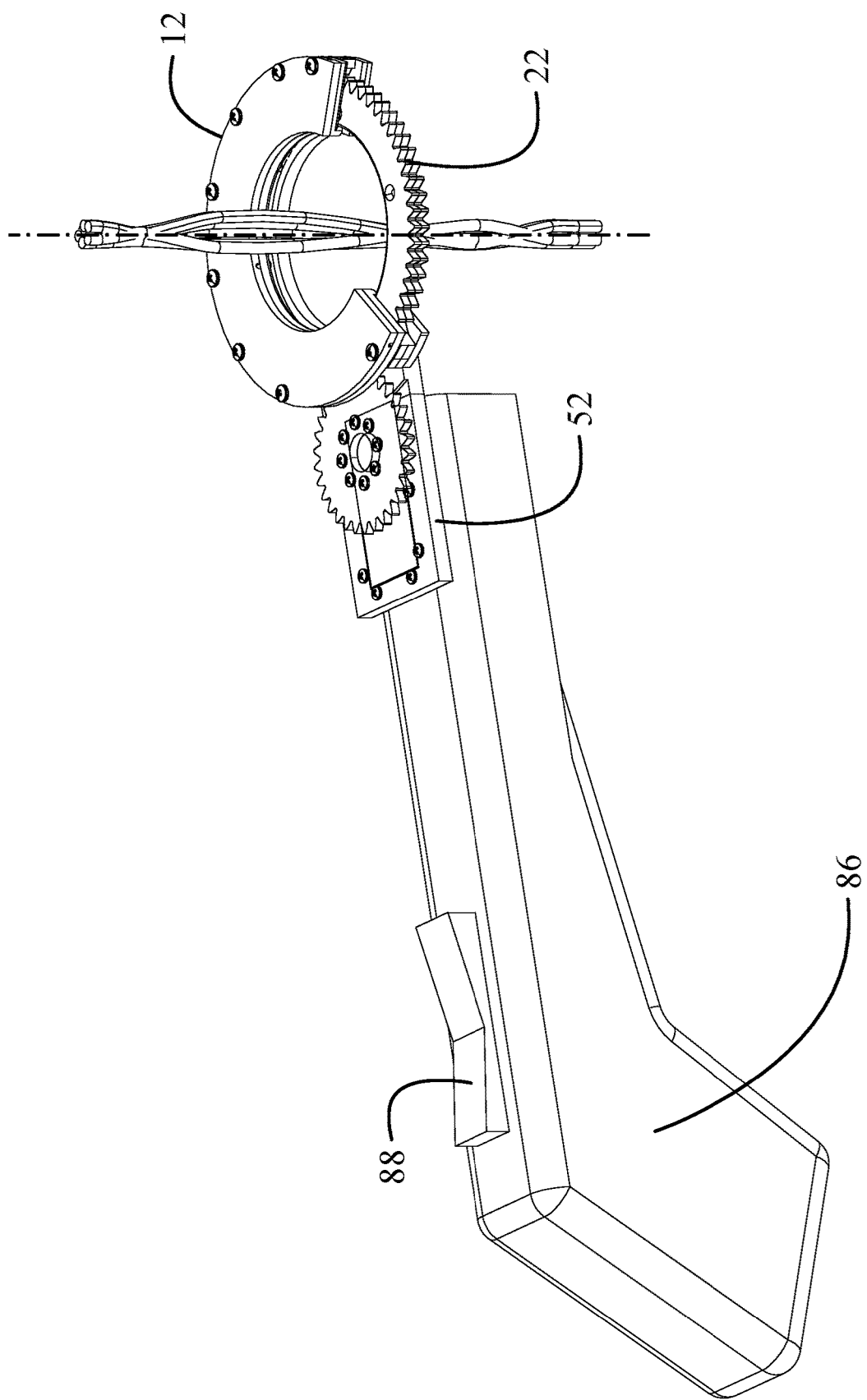
FIG. 13 is an exemplary configuration of the bundle gripping tool as a hand operated tool.
Figure 14:
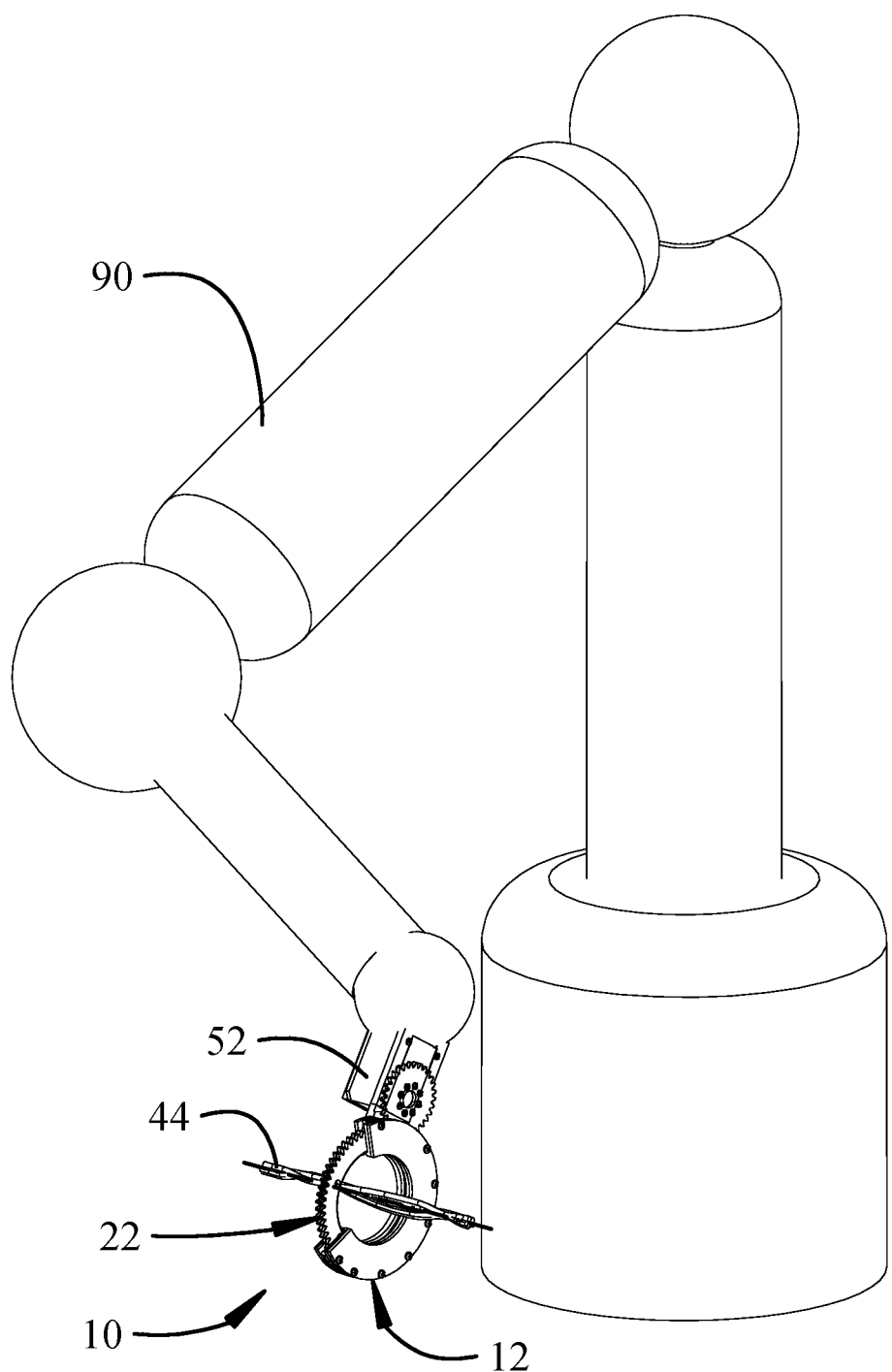
FIG. 14 is an exemplary configuration of the bundle gripping tool as an end effector for a robotic manipulator.
Figure 15:
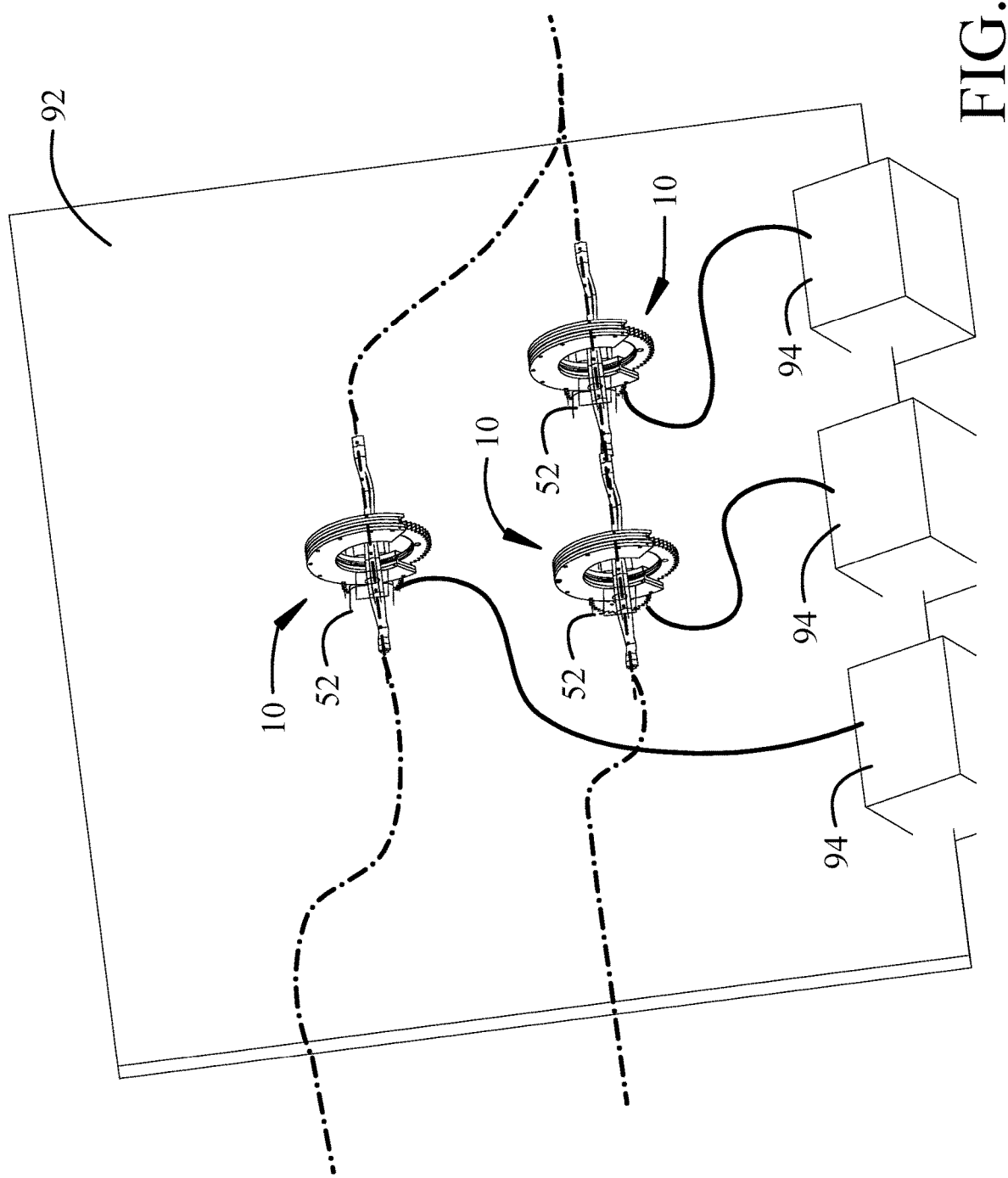
FIG. 15 is an exemplary configuration of the bundle gripping tool as cable support point on a cable harness layout board.
Figure 16:
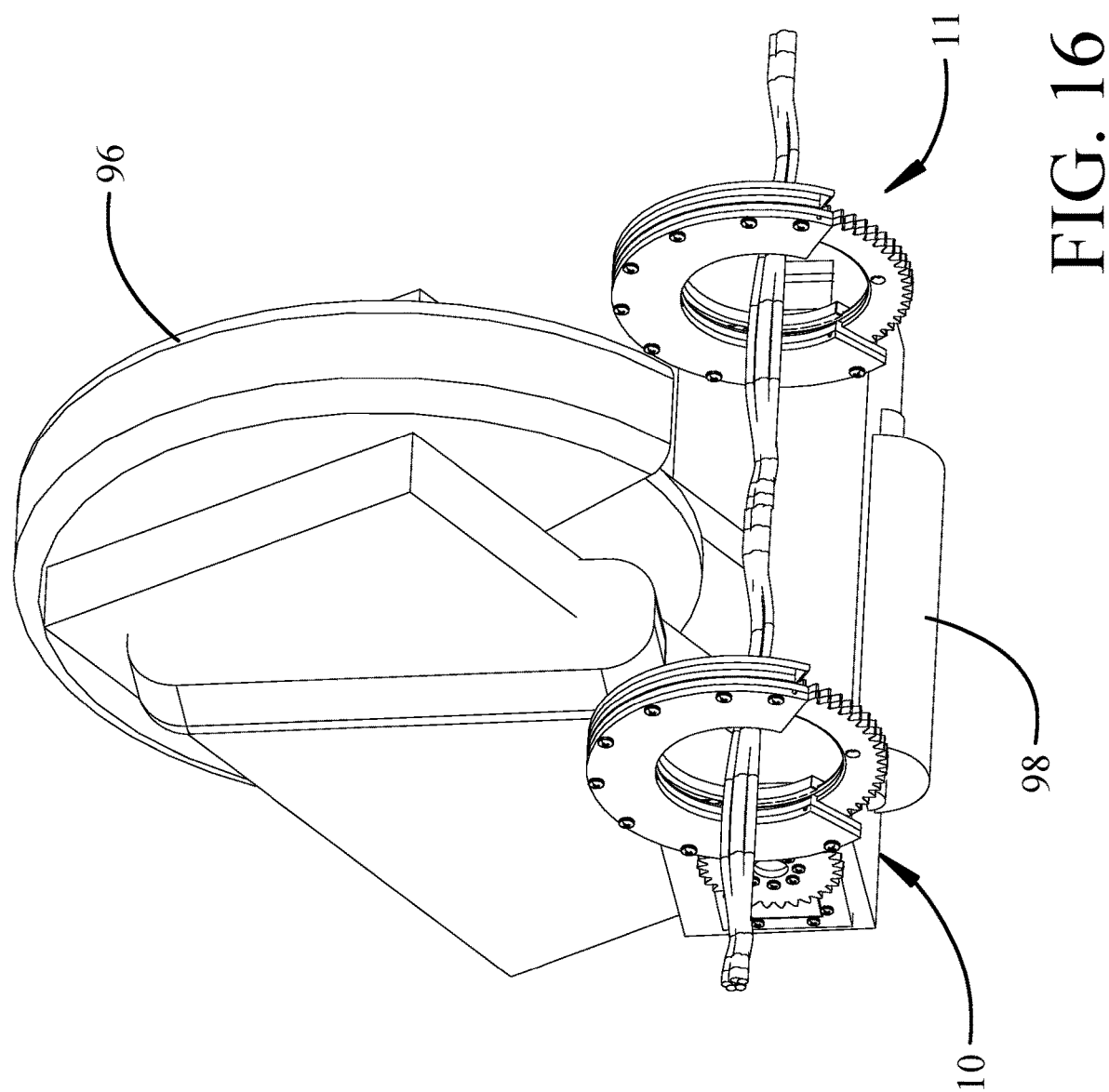
FIG. 16 is an exemplary configuration of the bundle gripping tool in conjunction with a cable cutoff tool; and, FIG. 17 is a flow chart showing a method for operation of an adaptive wire bundle gripping end effector employing the disclosed implementations.

The example of the bundle gripping tool is employable in a number of operational configurations. As seen in FIG. 13, the bundle gripping tool 10 with a handle 86 extending from or incorporating the body 52 allows manual positioning and operation of the tool. A trigger or rocker switch 88 mounted on the handle 86 is operably connected to the motor 50 to bi-directionally rotate the closure ring 22 to engage and disengage the tool from wire bundles in conjunction with the motor control 60. Similarly, the bundle gripping tool 10 is operable as an end effector for a robotic manipulator 90 with the body 52 configured for attachment to the manipulator 90 as seen in FIG. 14. One or more bundle gripping tools 10 are mountable by engaging the body 52 on a wire harness layout board 92 as shown in FIG. 15. Foot switches 94 or optical sensors on the board 92 connected to the motor 50 are employed to trigger engagement of the tool(s) upon insertion of the wire bundle 44. The bundle gripping tool 10 is combinable with additional wire harness fabrication tools such as a bundle cutter 96 attached to the body 52 as seen in FIG. 16. A single bundle gripping tool 10 could be used if the bundle cutter 96 is closely aligned with the gripping plane. Alternatively a double bundle gripping tool may be employed with the additional tool 11 added to gently tug the support rings away from each other with a pressure piston 98, thereby urging the wire bundle 44 tight prior to a cutting operation. Alternative fabrication tools such as a binder for the wire bundle 44 may also substituted for the cutter. Such a combination is also operable as an end effector for the robotic manipulator 90.

Figure 17:
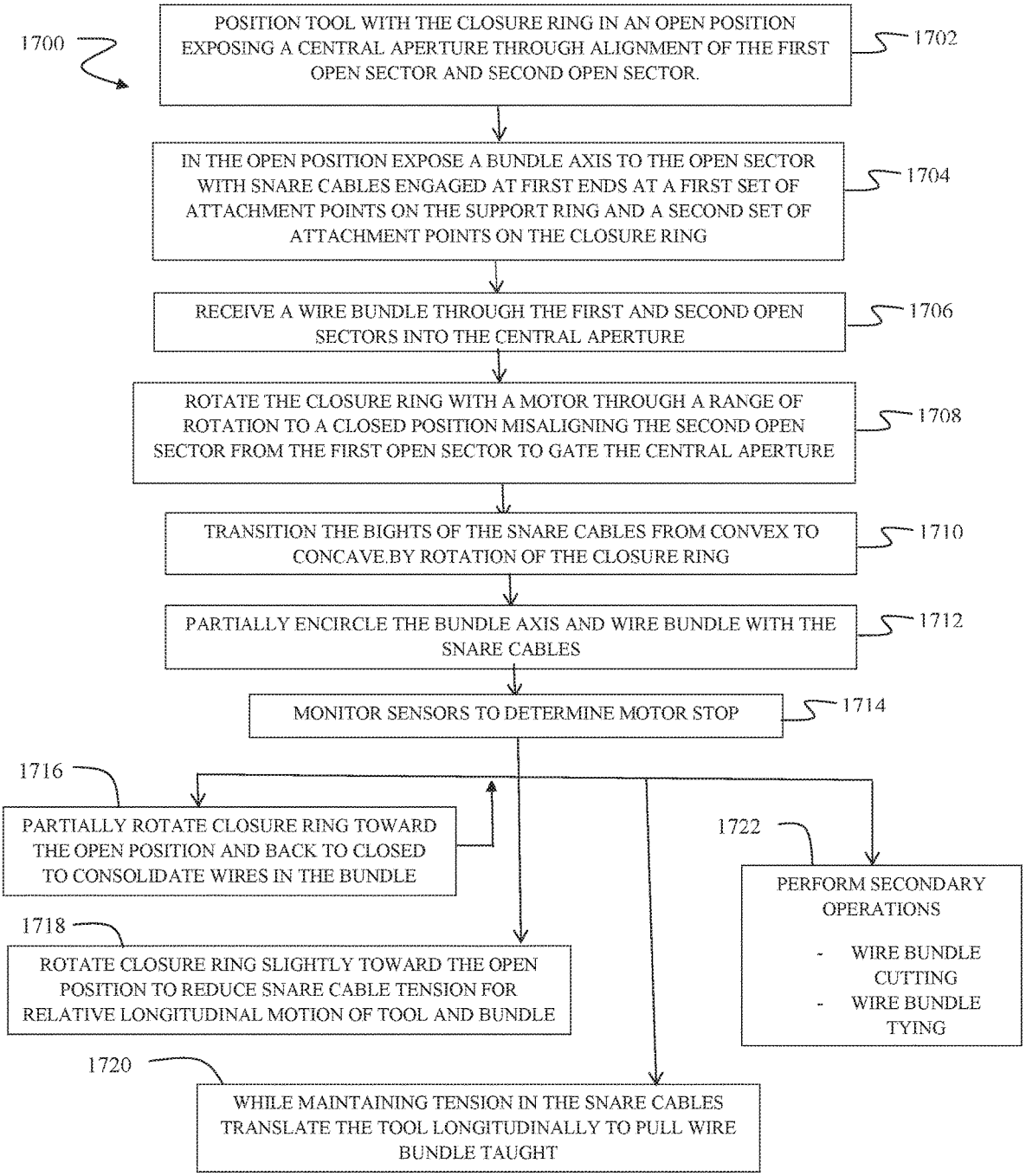

The described implementation for the bundle gripping tool 10 provides a method 1700 for handling of bundles such as wire bundles as shown in FIG. 17. A bundle gripping tool 10 having a support ring 12 and a rotatable closure ring 22 is positioned with the closure ring in an open position exposing a central aperture 20 through a first open sector 16 of the support ring and an aligned second open sector 30 on the closure ring, step 1702. In the open position, snare cables 38 engaged at first ends at a first set of attachment points on the support ring and on second ends at a second set of attachment points on the closure ring expose a bundle axis to the open sector, step 1704. A bundle is received through the first and second open sectors into the central aperture, step 1706, either by motion of the tool or insertion of the bundle. A motor 50 rotates the closure ring through a range of rotation to a closed position misaligning the second open sector from the first open sector covering the first open sector to gate the central aperture, step; 1708. Rotation of the closure ring transitions the bights of the snare cables from a convex configuration to a concave configuration, step 1710, whereby in the closed position, the snare cables partially encircling the bundle axis and inserted bundle, step 1712. Sensors 57 are monitored for tension in the snare cables 38, rotational position of the closure ring, motor torque or pressure to determine a motor stop position, step 1714. The closure ring 22 is partially rotated toward the open position and returned to the closed position several times consolidating all the contained wires in the wire bundle into a more circular form, step 1716. The closure ring 22 may also be rotated slightly toward the open position to allow reduced tension in the snare cables 38 allowing the bundle 44 or bundle gripping tool 10 to slide longitudinally along the bundle axis 14 relative to one another, step 1718. While maintaining tension in the snare cables 38, the bundle gripping tool 10 may be translated longitudinally along the bundle axis 14 with respect to the bundle 44 to pull the bundle taught, step 1720. Secondary operations such as cutting or tying the bundle may also be performed, step 1722.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A bundle gripping tool comprising:
a support ring concentric to a bundle axis and having a first open sector accessing a central aperture in the support ring;
a closure ring mounted on the support ring, the closure ring concentric with and rotatable about the bundle axis, the closure ring having a second open sector wherein rotation of the closure ring to an open position at least partially aligns the second open sector with the first open sector exposing the central aperture and rotation to a closed position, misaligning the second open sector from the first open sector, covers the first open sector gating the central aperture;
a plurality of snare cables engaged between a first set of attachment points on the support ring and a second set of attachment points on the closure ring, said first set of attachment points and second set of attachment points relatively positioned whereby each of said plurality of snare cables partially encircles the bundle axis in the closed position and exposes the bundle axis in the open position; and,
an operating mechanism configured to rotate the closure ring.

2. The bundle gripping tool as defined in claim 1 wherein the operating mechanism comprises:
a body extending from the support ring;
a motor encased in the body; and, a drive gear rotated by the motor, said drive gear engaging gear teeth on the closure ring to rotate the closure ring.

3. The bundle gripping tool as defined in claim 2 further comprising:
a handle extending from the body; and
a switch mounted on the handle and operably connected to the motor to bi-directionally rotate the closure ring to engage and disengage the tool from wire bundles.

4. The bundle gripping tool as defined in claim 2 wherein the body is configured for attachment to a robotic manipulator.

5. The bundle gripping tool as defined in claim 2 further comprising a bundle cutter attached to the body.

6. The bundle gripping tool as defined in claim 2 further comprising:
at least one sensor transmitting a control signal; and
a motor control configured to stop the motor upon receiving the control signal.

7. The bundle gripping tool as defined in claim 6 wherein the motor is an electric motor and the at least one sensor measures tension in at least one of the plurality of snare cables.

8. The bundle gripping tool as defined in claim 6 wherein the motor is electric and the at least one sensor measures torque on the motor.

9. The bundle gripping tool as defined in claim 6 wherein the motor is pneumatic and the at least one sensor is a relief valve maintaining a predetermined maximum back pressure.

10. The bundle gripping tool as defined in claim 6 wherein the at least one sensor measures angular rotation of the closure ring.

11. The bundle gripping tool as defined in claim 1 wherein the support ring comprises:
a receiving base; and
a cover mated to the receiving base, said receiving base and cover engage and constrain the closure ring in a rotational track.

12. The bundle gripping tool as defined in claim 11 wherein
the receiving base has a first channel with inner flange and outer flange;
the cover has a second channel with an inner flange and outer flange, said first channel outer flange and second channel outer flange engage to space the first channel and second channel creating the track to receive the closure ring; and,
the first channel inner flange and second channel inner flange provide a slot open to the central aperture through which the snare cables pass from the second set of attachment points on the closure ring.

13. The bundle gripping tool as defined in claim 12 wherein first channel outer flange and second channel outer flange incorporate a lateral channel receiving a drive gear to engage gear teeth on the closure ring.

14. The bundle gripping tool as defined in claim 11 wherein
the first set of attachment points comprise conduits in the cover of the support ring, said conduits receiving and constraining first ends of the snare cables.

15. The bundle gripping tool as defined in claim 11 wherein
the second set of attachment points comprise serpentine channels in the closure ring, said serpentine channels receiving and constraining second ends of the snare cables.

16. The bundle gripping tool as defined in claim 1 wherein a first sector angle of the first open sector and a second sector angle of the second open sector are equal.

17. The bundle gripping tool as defined in claim 16 wherein the first sector angle and second sector angle are in a range of 100 to 125°.

18. The bundle gripping tool as defined in claim 17 wherein the plurality of snare cables comprises three snare cables and
the first set of attachment points are positioned on the support ring proximate a first termination of the support ring, proximate a second termination of the support ring and an azimuthal position on the support ring intermediate the first termination and second termination; and
the second set of attachment points are positioned on the closure ring proximate a leading termination, proximate a trailing termination and an azimuthal position intermediate the leading termination and trailing termination.

19. A method for handling of bundles comprising:
positioning a bundle gripping tool having a support ring and a rotatable closure ring with the closure ring in an open position exposing a central aperture through a first open sector of the support ring and an aligned second open sector on the closure ring;
exposing a bundle axis in the open position with snare cables engaged at first ends at a first set of attachment points on the support ring and on second ends at a second set of attachment points on the closure ring;
inserting a bundle through the first and second open sectors into the central aperture;
rotating the closure ring with a motor through a range of rotation to a closed position misaligning the second open sector from the first open sector and covering the first open sector to gate the central aperture;
transitioning bights of the snare cables with rotation of the closure ring from a convex configuration to a concave configuration; and
partially encircling the bundle axis and inserted bundle with the snare cables in the closed position.

20. The method of claim 19 wherein the bundle is a wire bundle and further comprising:
partially rotating the closure ring toward the open position; and
returning the closure ring to the closed position consolidating all contained wires in the wire bundle into a more circular form.

* * * * *